(12) United States Patent
Gedan-Smolka et al.

(10) Patent No.: US 10,113,042 B2
(45) Date of Patent: Oct. 30, 2018

(54) METHOD FOR CURING AND SURFACE-FUNCTIONALIZING MOLDED PARTS

(75) Inventors: Michaela Gedan-Smolka, Grosskmehlen (DE); Uwe Gohs, Dresden (DE); Anett Mueller, Chemnitz (DE)

(73) Assignee: LEIBNIZ-INSTITUT FUER POLYMERFORSCHUNG DRESDEN E.V., Dresden (DE)

( * ) Notice: Subject to any disclaimer, the term of this patent is extended or adjusted under 35 U.S.C. 154(b) by 0 days.

(21) Appl. No.: 13/203,092

(22) PCT Filed: Feb. 4, 2010

(86) PCT No.: PCT/EP2010/051351
§ 371 (c)(1),
(2), (4) Date: Aug. 24, 2011

(87) PCT Pub. No.: WO2010/097276
PCT Pub. Date: Sep. 2, 2010

(65) Prior Publication Data
US 2011/0311733 A1    Dec. 22, 2011

(30) Foreign Application Priority Data
Feb. 25, 2009    (DE) .................. 10 2009 001 145

(51) Int. Cl.
C08J 7/18      (2006.01)
C08J 7/12      (2006.01)
B29C 71/02     (2006.01)
C08J 7/04      (2006.01)

(52) U.S. Cl.
CPC .............. C08J 7/123 (2013.01); C08J 7/04 (2013.01); C08J 7/08 (2013.01); C08J 7/18 (2013.01)

(58) Field of Classification Search
CPC ..... C08J 7/123; C08J 7/04–7/065; C08J 7/08; C08J 7/16; C08J 7/18
USPC ....... 264/1.36, 2.7, 402, 446, 470, 471, 473, 264/477, 485, 488, 496, 405, 424, 425, 264/494, 239; 427/491, 492, 493, 496, 427/500, 501, 508, 513, 514, 133
See application file for complete search history.

(56) References Cited

U.S. PATENT DOCUMENTS

| | | | |
|---|---|---|---|
| 2,961,389 A * | 11/1960 | Hines .................. | B29C 71/04 522/111 |
| 3,729,403 A * | 4/1973 | Kehr et al. ........... | B65H 7/00 156/331.7 |
| 3,997,627 A * | 12/1976 | Ichimura ........... | C08F 299/0478 523/508 |
| 4,273,830 A * | 6/1981 | Gillan et al. ......... | 428/398 |
| 4,525,257 A | 6/1985 | Kurtz et al. | |
| 4,598,128 A | 7/1986 | Randall et al. | |
| 4,639,379 A * | 1/1987 | Asai et al. ........... | 427/489 |
| 4,822,665 A * | 4/1989 | Scholz et al. ....... | 428/222 |
| 5,084,494 A * | 1/1992 | McDougal ........... | 523/211 |
| 5,206,092 A | 4/1993 | Araki et al. | |
| 5,234,756 A * | 8/1993 | Kohama et al. ..... | 442/391 |
| 5,891,292 A * | 4/1999 | Goodman ........... | C08J 5/24 156/242 |
| 6,114,486 A | 9/2000 | Rowland et al. | |
| 6,235,228 B1 * | 5/2001 | Nicholl et al. ....... | 264/255 |
| 6,582,648 B1 * | 6/2003 | Reif .................... | 264/461 |
| 6,689,851 B1 | 2/2004 | Rowland et al. | |
| 6,949,591 B1 * | 9/2005 | Allard ................. | C08J 3/243 427/487 |
| 7,141,276 B2 * | 11/2006 | Lehmann et al. ... | 427/492 |
| 2003/0212161 A1 * | 11/2003 | McKellop et al. .... | 522/3 |
| 2004/0009727 A1 * | 1/2004 | Lin ..................... | C08J 5/043 442/181 |
| 2004/0241417 A1 * | 12/2004 | Fischer ............... | B32B 5/18 428/317.9 |
| 2005/0024180 A1 * | 2/2005 | Handa ................. | 338/22 R |
| 2005/0129859 A1 * | 6/2005 | Misev et al. ........ | 427/384 |
| 2005/0194722 A1 * | 9/2005 | Muratoglu et al. .. | 264/488 |
| 2006/0058448 A1 * | 3/2006 | Higashino et al. ... | 524/544 |
| 2007/0085242 A1 | 4/2007 | Tamaki et al. | |
| 2008/0187693 A1 * | 8/2008 | Nielsen .............. | 428/34.1 |
| 2009/0098431 A1 * | 4/2009 | Yasumura ......... | H01M 8/0213 429/412 |
| 2009/0192610 A1 * | 7/2009 | Case et al. ......... | 623/16.11 |
| 2009/0246506 A1 * | 10/2009 | Zaluzec ............. | C08J 7/047 428/317.5 |
| 2010/0032081 A1 * | 2/2010 | Green ................. | B29C 47/0014 156/219 |

(Continued)

FOREIGN PATENT DOCUMENTS

| | | | | |
|---|---|---|---|---|
| DE | 60210935 T2 | 9/2002 | | |
| WO | WO2007/055236 A1 * | 5/2007 | ............. | H01M 8/02 |

OTHER PUBLICATIONS

Thierry Glauser; Electron-Beam Curing of Thermoset Resins for Composites; Kungl Tekniska Hogskolan; ISBN: 91-7170-443-4; (maybe Sep. 24, 1999); pp. 1-63.*

(Continued)

*Primary Examiner* — Marianne L Padgett
(74) *Attorney, Agent, or Firm* — Greenblum & Bernstein, P.L.C.

(57) ABSTRACT

A method for curing and surface functionalization of molded parts, including processing materials that contain at least one unsaturated radically or cationically curable reactive resin system and further substances to form a molded part and cross-linking the materials up to dimensional stability during or after the processing. The method additionally includes subjecting the molded part to energetic radiation or energetic particles at least one of during the cross-linking and subsequent to the cross-linking to essentially complete curing at least of a surface region of the molded part to produce an essentially completely coatable molded part surface.

19 Claims, No Drawings

(56) References Cited

U.S. PATENT DOCUMENTS

| | | | |
|---|---|---|---|
| 2010/0035017 A1* | 2/2010 | Green | B29C 47/0014 428/114 |
| 2011/0064883 A1* | 3/2011 | Goodwin | 427/508 |

OTHER PUBLICATIONS

Lionetto et al.; "Monitoring the Cure State of Thermosetting Resins by Ultrasound"; Materials 2013, 6; pp. 3783-3804; published Sep. 5, 2013.*

W.J. Sichina; "Characterization of Epoxy Resins Using DSC"; Thermal Analysis application note; Perkin Elmer instruments; Norwalk, Connecticut USA; 4 pages; 2000 (no. month).*

Overviews; "injection molding"; www.customerpartnet.com/WU/ injection molding; 13 pages, retrieved Apr. 15, 2016, copyright 2007.*

Gedan-Smolka, et al.; "Electron pretreatment of sheet molding compounds (SMC)"; Progress in Organic Coatings; 72 (2011 [no month given, but after Feb. 1]); pp. 159-167.*

Hamid G. Kia, editor; Sheet Molding Compounds Science and Technology; hence are publishers, New York; 1993 (no month); excerpts: introduction pp. 1-3 by H.G. Kia & chapter 12, pp. 215-218 by Daniel Guillon.*

Liebold, "Lackierbarkeit von SMC-Substraten," Lackiertechnik, 2001.

Abaris, "Electron Beam Curing—A Cost Analysis," EB Curing Technology, 1994.

Norris et al., "Selection of Materials to be Utilized in Fabrication Tooling for Electron-Beam Curing of Composites," 1996.

Liebold, "Dicht machen", Farbe & Lack, Jul. 1, 2002.

Joesel, "Process Conditions for UV Sealer on SMC Body Panels", Radtech Report, Nov. 1, 2001.

Castro et al., "In-Mold Coating," Kia, Sheet Molding Compounds-Science and Technology, Hanser Verlag Munich, 1993.

Charlesby, "Cross-linking of polythene by pile radiation," Jul. 1, 1952.

* cited by examiner

METHOD FOR CURING AND SURFACE-FUNCTIONALIZING MOLDED PARTS

CROSS REFERENCE TO RELATED APPLICATIONS

The present application is a U.S. National Stage of International Application No. PCT/EP2010/051351 filed Feb. 4, 2010, which published as WO 2010/097276 A1 on Sep. 2, 2010, the disclosure of which is expressly incorporated by reference herein in its entirety. Further, this application claims priority under 35 U.S.C. § 119 and § 365 of German Application No. 10 2009 001 145.5 filed Feb. 25, 2009.

BACKGROUND OF THE INVENTION

1. Field of the Invention

The invention relates to the fields of chemistry and process engineering and relates to a method for curing and surface modification of molded parts of polymerizable resins with optionally polymerizable monomers, filler materials and reinforcing materials (fibers), pigments as well as additives, for example, of sheet molding compound (SMC) or bulk molding compound (BMC), which then can be used as molded parts, for example, in the automobile industry, in vehicle construction, and/or in the electrical industry.

2. Background Description

The increasing commercial application of thermoset molded parts, for example, of fiber polymer matrix molded parts, such as, for example, SMC and BMC components, in a variety of technical fields, such as the vehicle industry, rail vehicle construction, the electrical industry and tool-building, requires production methods with which the components can be produced with good quality and in the shortest possible time. In most cases, a coating of the components is subsequently necessary, which makes further demands on the materials and production methods.

To produce components from SMC and BMC materials, for example, cross-linkable resins, oligomers, reactive thinning agents, fibers and additives are used, which must cross-link within continuous processes. This can be carried out in the case of SMC components, for example, during the molding of the component by pressing at high temperatures. The surface quality, which is important for a subsequent coating by painting, thereby depends on the material system, the production method, the production parameters and the roughness and waviness of the tool surface. Since the surface quality necessary for a subsequent painting often cannot be ensured in sufficient quality in the production process, and furthermore, residues of the internal and/or external pressing aids, such as mold release agents, are also still present, further process steps, such as deburring, padding, powerwash or flame treatment, are added in order to obtain the wettable surface necessary for painting, which then also renders possible a good adhesion of the coating.

Currently all industrial molding and coating processes for SMC components with liquid coatings, water-based paints, or powder coatings with subsequent baking process up to cross-linking of the polymers (paint film) exhibit marked problems, which lead to fluctuating quality and an inadequate process stability. These are caused, among other things, by residual monomers, oligomers or reactive thinning agents, which migrate to the surface due to temperature stress and are also released to the atmosphere (fogging). Also, in the downstream painting process they can leak out of the SMC material, and thus cause paint film faults (e.g., pores, pinholes, cracks, delaminations) (R. Liebold, Farbe+Lack, 108, 7 (2002) p. 4).

In order to protect the SMC molded parts from the effects of the gas emissions in the painting process as well as possible, in particular for so-called class A components, sealing materials, such as primers or sealers (K. Joesel, Radtech Report, November/December 2001, 23 et seq.) are applied before the painting process in an additional process step, and these are then largely dried without or with moderate thermal stress. Another variant represents the application of the sealing layer via in-mold-coating (IMC) directly in the thermal pressing process. The disadvantage of this method variant is a limitation to geometrically simply structured components (Castro et al., "In-Mold Coating," H. G. Kia: Sheet Molding Compounds-Science and Technology, Hanser Verlag Munich 1993, p. 163 et seq.). These additional process steps are laborious, expensive and prolong the production process.

Furthermore, methods are known for polymer modification with energetic electrons, such as, for example, the cross-linking of polymers (e.g., thermoplastics, elastomers), the curing of reactive resin systems to produce fiber polymer matrix molded parts and the functionalization of polytetrafluoroethylene (PTFE). These applications are based on a spatially and temporally precise input of energy by energetic electrons to generate excited atoms or molecules as well as ions that preferably form radicals and induce complex chemical reactions. As a result, a polymer is produced with altered chemical, electrical, mechanical and thermal properties (A. Charlesby, Proc. Roy. Soc. A, 1952, vol. 215, pp. 187-214).

The curing of reactive resin systems by energetic electrons to produce fiber polymer matrix composites has hitherto been used chiefly for purposes in the military or in aerospace. Advantages of curing with energetic electrons are the possibility of producing large components without the use of an autoclave, an increased energy efficiency of up to 70% (compared to the thermal pressing process), extended handling times, low shrinkage, low gas emission, low residual stresses, low water absorption, higher glass transition temperatures, shorter curing times and the possibility of the complete incorporation of the materials used into the network (Abaris, E B Curing Technology, Las Vegas, 1994; Norris, R., EB Curing of Composites Workshop, 1996).

In combination with the curing by energetic electrons, the production methods of winding, pultration, prepreg with vacuum bag or vacuum-assisted resin transfer molding (VARTM) or resin transfer molding (RTM) are used. Large electron accelerators and high investment costs restricted the use of the curing of reactive resin systems by energetic electrons to the above-referenced high-tech fields. Compact and efficient electron accelerators available on the world market now render possible a compact system structure including shielding and the integration into the production line in a variety of technical fields, such as, for example, the vehicle industry, rail vehicle construction, the electrical industry and tool-building.

However, with the known methods the problems of fluctuating quality and insufficient process stability of the production process cannot be completely eliminated or can be eliminated only using complex and expensive additional process steps, since these are associated with the production method currently used.

SUMMARY OF THE INVENTION

The aim of the present invention is to disclose a method for curing and surface functionalization of molded parts which can be carried out in particular in a short time and with a high degree of reproducibility and leads to an improvement in the surface quality of the molded parts to be painted.

The aim is attained with the invention disclosed in the claims. Advantageous embodiments are the subject matter of the subordinate claims.

DETAILED DESCRIPTION OF THE INVENTION

With the method according to the invention for curing and surface functionalization of molded parts, materials that contain at least one unsaturated radically or cationically curable reactive resin system and further substances, are processed to form a molded part and during or after the molding process with or without coating are cross-linked up to dimensional stability, and during the cross-linking and/or subsequently, before and/or after a coating, the molded part is subjected to a processing by energetic radiation or energetic particles up to essentially complete curing at least of the surface region of the molded part and to the production of an essentially completely coatable molded part surface.

Advantageously, molded parts, which are composed of a fiber reinforced polymer material, are produced and subjected to a processing with energetic radiation or energetic particles. More advantageously the fiber reinforced polymer materials are composed of unsaturated polyester resins or acrylic resins (acrylates, methacrylates) or epoxy resins with a cationic initiator.

Furthermore advantageously, an unsaturated reactive resin system is used, which contains further materials. More advantageously additives and/or fillers and/or reinforcing elements and/or further polymers and/or reactive thinning agents are used as further materials.

Likewise advantageously, molded parts are used that are composed of SMC and/or BMC.

And also advantageously, the molded parts are molded by hot pressing.

It is also advantageous if the cross-linking is thermally initiated, wherein still more advantageously the cross-linking is carried out up to molded part stability.

Furthermore, it is advantageous if the processing by energetic radiation or energetic particles is carried out in a reactive gas environment and/or in air.

It is likewise advantageous if the processing by energetic electrons, gamma radiation or infrared radiation or microwave radiation or induction input is carried out in combination with a plasma treatment.

And it is also advantageous if the processing is carried out exclusively with energetic electrons in a reactive gas environment and/or in air.

It is also advantageous if the processing is carried out with doses in the range of 10 kGy to 250 kGy.

Furthermore, it is advantageous if the dose application is carried out in at least two steps with the same dose per treatment step.

It is likewise advantageous if the dose application is carried out in at least two steps with a different dose per treatment step.

It is also advantageous if the processing is carried out at temperatures of 5° C. up to temperatures at which the thermal molded part stability of the materials is ensured.

And it is likewise advantageous if the processing is carried out on coated fiber polymer matrix molded parts, wherein even more advantageously a painting is carried out as a coating.

With the method according to the invention it is possible for the first time in a relatively short period of time and with low expenditure to obtain a molded part which is largely cured in order to prevent a leakage of low-molecular constituents, such as residual monomers, oligomers or reactive thinning agents with subsequent temperature stress during the painting process, from the SMC and BMC material, and the surface properties of which for further processing are adequate to good or very good. Cured is thereby understood as a state in which residual reactivity can no longer be detected in the component via differential scanning calorimetry (DSC) measurements. In particular this applies to coated molded parts, which can be cured according to the invention before or during or after the coating. These coated molded parts processed according to the invention exhibit good to excellent surface qualities.

The method according to the invention can be applied in particular for painted SMC and BMC molded parts. Within the scope of the present invention SMC should be understood as a processable, flat semi-finished product of cross-linkable usually unsaturated polyester resins, glass fibers and necessary additives, which is processed in heated presses to form molded parts. Within the scope of the present invention BMC should be understood as an injection-moldable or transfer-moldable molding material with cut glass fibers. The fiber lengths of BMC are thereby smaller than of SMC [Liebold, R.: mo 55 (2001) p. 41].

SMC and BMC molded parts are fiber polymer matrix molded parts that are produced from a reactive prepreg (resin-impregnated resin mat, SMC—sheet molding compound) via thermal compression at increased temperature or bulk material (BMC—bulk molding compound) via injecting molding or thermal compressing and are cross-linked up to dimensional stability. The components are produced, shaped and cross-linked according to known processes.

The inventors of the present solution were able to establish that these molded parts according to the prior art within the industrial process steps and industrial process times during the thermal compression evidently do not cross-link to an adequate extent and in a reproducible manner, and a cured molded part is not subsequently obtained. The complete curing then usually only takes place in a further temperature treatment that is done in the course of the baking of the paint films. The known gas emissions and the disadvantageous effects on the paint film thereby occur.

In order to avoid these disadvantageous processes, it was proposed according to the invention to carry out a curing and a surface functionalization. The curing thereby takes place according to the invention in a desired volume of the molded part. The desired volume of a molded part is essentially completely cured thereby. However, the desired volume in terms of the molded part can also relate not to the entire molded part but, for example, only one side of the molded part can be cured or only one surface region of the molded part.

According to the invention, the molded parts for the curing are impinged with energetic radiation or energetic particles, which then generate excited atoms or molecules as well as ions, which preferably form radicals and induce complex chemical reactions in the molded part and/or in the desired volume of the molded part.

Through the solution according to the invention, although an additional process step is introduced into the process sequence, within a short time (e.g., the cycle time of the production process) the solution according to the invention cures the molded parts such that surface defects essentially no longer occur through gas emissions and/or postcuring in the subsequent coating processes.

One advantage of the solution according to the invention is that with molded parts to be coated as well as with uncoated molded parts, the gas emission of low-molecular substances, such as, for example, reactive thinning agent residues, is prevented virtually completely to completely, so that surface defects and fogging no longer occur. Fogging should be understood as referring to the emission of highly volatile substances, such as reactive thinning agent residues, for example, in the use condition of uncoated or partially coated SMC compression molded parts.

It is thereby advantageous according to the invention if the processing is realized in several steps and/or with alternating application of energy per step (e.g., dose, i.e., absorbed energy per mass unit). Nevertheless, these processing times can also be fitted into the usual cycle times of the industrial production process/production lines. The applications of energy are thereby selected depending on the material composition of the molded part, its dimensions, and depending on the pressing conditions.

It is also possible to carry out the curing of the molded parts only in the surface regions of the molded parts. This is advantageous in particular when large molded part thicknesses are present. The cured region has to be so thick thereby that no disadvantageous effects occur for the subsequent process steps. In particular, this cured surface region prevents materials still possibly located in the molded part, which either have not yet been cured and/or are volatile, from being able to leave the molded part, but nevertheless essentially have no negative effects on the surface of the molded part to be painted.

Through the solution according to the invention a cost-effective solution has been found, with which additional refinishing can be omitted, which has been rendered possible by the thorough consideration for determining the causes.

The particular advantage of the present solution lies not only in the curing of the molded parts or of volume regions or surface regions of the molded parts, but also in the fact that with the application of energy through energetic radiation or energetic particles, functional groups are also generated on the surface and/or in regions close to the surface of the molded parts, which lead to a better adhesion of the coating and an increase of the hydrophilicity of the surface. In this manner an improvement of the surface quality of the molded part surface, and thus, also of the painted/coated molded parts is ultimately also obtained.

The invention is explained in more detail below based on several exemplary embodiments.

Example 1

An automobile molded part is produced from a prepreg of a low-profile formula SMC paste:

| | |
|---|---|
| Unsaturated polyester resin (60% by weight in styrene) | 60 pbw |
| Low-profile additive (40% by weight in styrene) | 40 pbw |
| Calcium carbonate | 10 pbw |
| t-butyl peroxybenzoate | 1.5 bpw |
| Zinc stearate | 4 pbw |
| Magnesium oxide | 1 pbw |

-continued

| SMC prepreg: | |
|---|---|
| SMC paste | 75% by weight |
| Glass fibers (cut, length: 1 inch) | 25% by weight | under the following conditions via thermal pressing:
Temperature/female die: 140° C.; temperature/male die: 139° C., closing time: 12 s, pressing time: 180 s; compacting pressure: 14 MPa.

The residual reactivity in the molded part determined via DSC is −8 J/g based on the initial reactivity of the prepreg of −40 J/g.

Subsequently, the molded part is irradiated by electrons with a dose of 140 kGy in air atmosphere at a product speed of 0.3 m/minute. The irradiation takes place in the process sequence between the ejection of the molded part from the press and the subsequent processing steps. Thereafter residual reactivity can no longer be detected in the molded part by DSC and the molded part is thus completely cured. The wetting contact angle with water as test liquid drops from 98° to 78° as a result of the incorporation of oxygen-containing groups into the surface.

Example 2

A commercial vehicle molded part is produced from a prepreg of a low-profile formula under the following conditions by thermal pressing:
Temperature/female die: 140° C.; temperature/male die: 139° C., closing time: 12 s, pressing time: 180 s; compacting pressure: 14 MPa.

The residual reactivity determined in the molded part via DSC is −7 J/g based on the initial reactivity of the prepreg of −37 J/g.

Subsequently, the molded part is irradiated by electrons with individual doses of 7×20 kGy at a product speed of 2.1 m/minute under air atmosphere. The irradiation is carried out in the process sequence between the ejection of the molded part from the press and the subsequent processing steps. Thereafter residual reactivity can no longer be detected in the molded part by DSC and the molded part is completely cured. The wetting contact angle with water as test liquid drops from 100° to 32° as a result of the incorporation of oxygen-containing groups into the surface.

Example 3

An automobile molded part is produced from a prepreg of a low-shrink formula (see above)

| | |
|---|---|
| Unsaturated polyester resin (70% by weight in styrene) | 16.4% by weight |
| Polystyrene (40% by weight in styrene) | 11% by weight |
| Para-t-butyl peroxybenzoate | 0.3% by weight |
| Zinc stearate | 0.7% by weight |
| Calcium carbonate | 41.1% by weight |
| Magnesium oxide | 0.5% by weight |
| Glass-fiber roving (cut, 1 inch length) | 30% by weight | under the following conditions via thermal pressing:
Temperature/female die: 140° C.; temperature/male die: 139° C., closing time: 12 s, pressing time: 180 s; compacting pressure: 14 MPa.

The residual reactivity in the molded part determined by DSC is −2.2 J/g based on the initial reactivity of the prepreg of −24 J/g.

Subsequently, the component is completely cured via electron irradiation with 70 kGy at product transport speeds of 0.6 m/minute and subsequently with 7×10 kGy at a product speed of 4.2 m/minute under air atmosphere. Thereafter residual reactivity can no longer be established in the component by DSC. The wetting contact angle with water as test liquid drops from 95° to 72° as a result of the incorporation of oxygen-containing groups into the surface. The roughness is in a comparable range to the state after the pressing process.

Example 4

An automobile molded part is produced from an SMC prepreg of an automotive class A formula under the following conditions via thermal pressing:
Temperature/female die: 150° C.; temperature/male die: 145° C., closing time 10 s, pressing time: 160 s; compacting pressure 12 MPa.

The residual reactivity in the molded part determined via DSC is 17% on average depending on the thickness based on the initial reactivity of the prepreg of −41 J/g. With a component thickness ~2.2-3.2 mm a residual reactivity between 14 and 20%, with ~5.4 mm of 13% and with ~10.3 mm of 10% of the initial reactivity of the prepreg was thereby determined.

Subsequently, the molded part is irradiated by electrons with individual doses of 12×10 kGy at a product speed of 4.2 m/minute under air atmosphere. The irradiation takes place in the process sequence between the ejection of the molded part from the press and the following processing step. Thereafter residual reactivity can no longer be detected in the molded part by DSC and the molded part is completely cured. The wetting contact angle with water as test liquid drops from 95° to 72° as a result of the incorporation of oxygen-containing groups into the surface.

The invention claimed is:

1. A method for curing and surface functionalization to produce surface-functionalized molded parts, comprising:
    processing at least one material of
        a fiber reinforced polymer material,
        a sheet molding compound (SMC),
        a bulk molding compound (BMC), and
        a fiber-polymer-matrix part to form a molded part;
            wherein the material is an unsaturated radically curable reactive resin system and further substances; and
    during or after the processing of the at least one material to form the molded part,
        partially curing the material of the molded part to dimensional stability by cross-linking, which is thermally initiated, to form a partially-cured molded part; and then
        subjecting the partially-cured molded part to energetic electrons in an oxygen-containing atmosphere and with a dose application in at least two treatments to essentially completely cure at least a surface region of the partially-cured molded part, to generate oxygen-containing functional groups from the atmosphere on the surface and/or in regions close to the surface of the partially-cured molded part, and to increase hydrophilicity of the surface of the partially-cured molded part, thereby producing a surface-functionalized molded part;
    wherein,
        after subjecting the partially-cured molded part to the energetic electrons in the oxygen-containing atmosphere to form the surface-functionalized molded part, gas emission from the surface of the surface-functionalized molded part, of any residual monomers, residual oligomers, or residual reactive thinning agents that remain, is virtually completely prevented, and
        no residual reactivity is detectable in the surface-functionalized molded part surface via differential scanning calorimetry (DSC) measurements.

2. The method of claim 1, further comprising coating the molded part such that the molded part has a coating layer during the cross-linking.

3. The method of claim 1, wherein the molded part does not include a coating layer during the cross-linking.

4. The method of claim 1, wherein the fiber reinforced polymer material is processed to form the molded part.

5. The method of claim 4, wherein the fiber reinforced polymer material comprises one of: unsaturated polyester resins; acrylic resins; and epoxy resins with a cationic initiator.

6. The method of claim 5, wherein the fiber reinforced polymer material comprises an acrylic resin, which comprises at least one of acrylates and methacrylates.

7. The method of claim 1, wherein the further substances comprise at least one of additives, fillers, reinforcing elements, further polymers, and reactive thinning agents.

8. The method of claim 1, wherein the sheet molding compound (SMC) or the bulk molding compound (BMC) is processed to form the molded part.

9. The method of claim 1, wherein processing at least one of the fiber reinforced polymer material, the sheet molding compound (SMC), the bulk molding compound (BMC), and the fiber polymer matrix part to form the molded part comprises a hot pressing.

10. The method of claim 1, wherein the oxygen-containing atmosphere is air.

11. The method of claim 1, wherein the subjecting the partially-cured molded part to the energetic electrons is carried out in combination with a plasma treatment.

12. The method of claim 1, wherein the subjecting the partially-cured molded part to the energetic electrons is carried out with doses in the range of 10 kGy to 250 kGy.

13. The method of claim 1, wherein the dose application is carried out with the same dose per treatment step.

14. The method of claim 1, wherein the dose application is carried out with a different dose per treatment step.

15. The method of claim 1, wherein the fiber-polymer-matrix part is processed to form the molded part.

16. The method of claim 1, further comprising applying a coating of paint to the surface-functionalized molded part.

17. The method of claim 1, further comprising applying a coating to the molded part at least one of prior to or subsequent to subjecting the partially-cured molded part to the energetic electrons.

18. The method of claim 17, wherein the coating is applied prior to subjecting the partially-cured molded part to the energetic electrons.

19. The method of claim 17, wherein the coating is applied subsequent to subjecting the partially-cured molded part to the energetic electrons.

* * * * *